United States Patent
Erbis et al.

(10) Patent No.: US 11,686,336 B2
(45) Date of Patent: Jun. 27, 2023

(54) SEMI-HOLLOW PUNCH RIVET, A PUNCH RIVET JOINT OF AT LEAST TWO COMPONENTS BY MEANS OF A SEMI-HOLLOW PUNCH RIVET AS WELL AS A METHOD FOR CONNECTING THE COMPONENTS WITH THE SEMI-HOLLOW PUNCH RIVET

(71) Applicant: BÖLLHOFF VERBINDUNGSTECHNIK GmbH, Bielefeld (DE)

(72) Inventors: Sergej Erbis, Borchen (DE); Dennis Henke, Herzebrock-Clarholz (DE); Franz Ferdinand Menne, Bad Lippspringe (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 120 days.

(21) Appl. No.: 16/748,135

(22) Filed: Jan. 21, 2020

(65) Prior Publication Data
US 2020/0240452 A1   Jul. 30, 2020

(30) Foreign Application Priority Data
Jan. 30, 2019  (DE) .......................... 102019102383.1

(51) Int. Cl.
*F16B 19/08*  (2006.01)
*B21J 15/02*  (2006.01)

(52) U.S. Cl.
CPC .......... *F16B 19/086* (2013.01); *B21J 15/025* (2013.01)

(58) Field of Classification Search
CPC ........... F16B 19/086; F16B 19/06; F16B 5/04
See application file for complete search history.

(56) References Cited

U.S. PATENT DOCUMENTS

| | | | | |
|---|---|---|---|---|
| 203,815 A | * | 5/1878 | Bray | ........................ F16B 19/06 411/501 |
| 216,719 A | * | 6/1879 | Bray | ........................ F16B 19/06 411/501 |

(Continued)

FOREIGN PATENT DOCUMENTS

| CN | 102686892 A | 9/2012 |
|---|---|---|
| CN | 105188986 A | 12/2015 |

(Continued)

OTHER PUBLICATIONS

JP Office Action for JP Application No. 2020-009991 dated Dec. 22, 2020 (11 pages).

(Continued)

*Primary Examiner* — Flemming Saether
(74) *Attorney, Agent, or Firm* — Reising Ethington P.C.

(57) ABSTRACT

A semi-hollow punch rivet by which a joint is establishable. The rivet includes: a rivet head having a rivet shaft, which comprises a lateral surface, a rivet foot having a foot front surface is provided at an end of the rivet shaft facing away from the rivet head, the foot front surface is perpendicular to a longitudinal axis $L_A$ of the rivet shaft, and a bell-like shaft cavity extends into the rivet shaft beginning at the end facing away from the head. The shaft cavity is formed by: an inlet portion beginning at a radial inner side of the foot front surface and extending arc-shaped with an inlet radius $R_S$ in the direction of the rivet head, a linearly extending continuation portion into which the inlet portion transitions tangentially and which is arranged in an acute angle with respect to the lateral surface, and a final dome portion.

20 Claims, 9 Drawing Sheets

(56) References Cited

U.S. PATENT DOCUMENTS

| | | | | |
|---|---|---|---|---|
| 4,221,041 | A | * | 9/1980 | Hufnagl .................. B21J 15/02 29/512 |
| 5,957,777 | A | * | 9/1999 | Singh ....................... B21H 1/18 470/29 |
| 6,325,584 | B1 | * | 12/2001 | Marko .................. B21J 15/025 411/179 |
| 6,763,568 | B1 | * | 7/2004 | Mauermann ........... B21J 15/025 29/243.53 |
| 7,762,753 | B2 | * | 7/2010 | Jokisch ................. F16B 19/086 411/501 |
| 8,070,406 | B2 | * | 12/2011 | Trinick .................. B21J 15/025 411/501 |
| 8,506,228 | B2 | * | 8/2013 | Singh ..................... F16B 19/08 411/501 |
| 8,763,233 | B2 | * | 7/2014 | Bartig ................... B21J 15/025 29/525.06 |
| 9,797,428 | B2 | | 10/2017 | Rintelmann et al. |
| 9,803,675 | B2 | | 10/2017 | Hofmann et al. |
| 10,047,778 | B2 | | 8/2018 | Rintelmann et al. |
| 10,465,730 | B2 | | 11/2019 | Hofmann et al. |
| 10,876,565 | B2 | * | 12/2020 | Henke .................... B21J 15/025 |
| 2013/0000101 | A1 | | 1/2013 | Rintelmann et al. |
| 2013/0055549 | A1 | * | 3/2013 | Auriol ..................... B21J 15/04 29/525.07 |
| 2017/0009794 | A1 | | 1/2017 | Henke et al. |
| 2018/0045237 | A1 | | 2/2018 | Hofmann et al. |
| 2020/0116180 | A1 | * | 4/2020 | Sasaki .................... B21J 15/025 |

FOREIGN PATENT DOCUMENTS

| | | |
|---|---|---|
| CN | 108555219 A | 9/2018 |
| DE | 19927103 A1 | 12/2000 |
| DE | 102005020416 B4 | 8/2007 |
| DE | 102009050342 B4 | 10/2011 |
| DE | 102013020504 A1 | 6/2015 |
| DE | 102014201976 A1 | 8/2015 |
| EP | 0833063 B1 | 7/2002 |
| EP | 1229254 B1 | 1/2005 |
| EP | 2024651 B2 | 3/2014 |
| GB | 2141369 A | 12/1984 |
| JP | H09317730 A | 12/1997 |
| JP | 2003501269 A | 1/2003 |
| JP | 2003106316 A | 4/2003 |
| JP | 2004076854 A | 3/2004 |
| JP | 2013502550 A | 1/2013 |

OTHER PUBLICATIONS

CN Office Action for CN Application No. 202010071166.8 dated Mar. 26, 2021 (13 pages).

JP Allowance for JP Application No. 2020-009991 dated Jun. 29, 2021 (4 pages).

CN Office Action for CN Application No. 202010071166.8 dated Nov. 17, 2021 (9 pages).

* cited by examiner

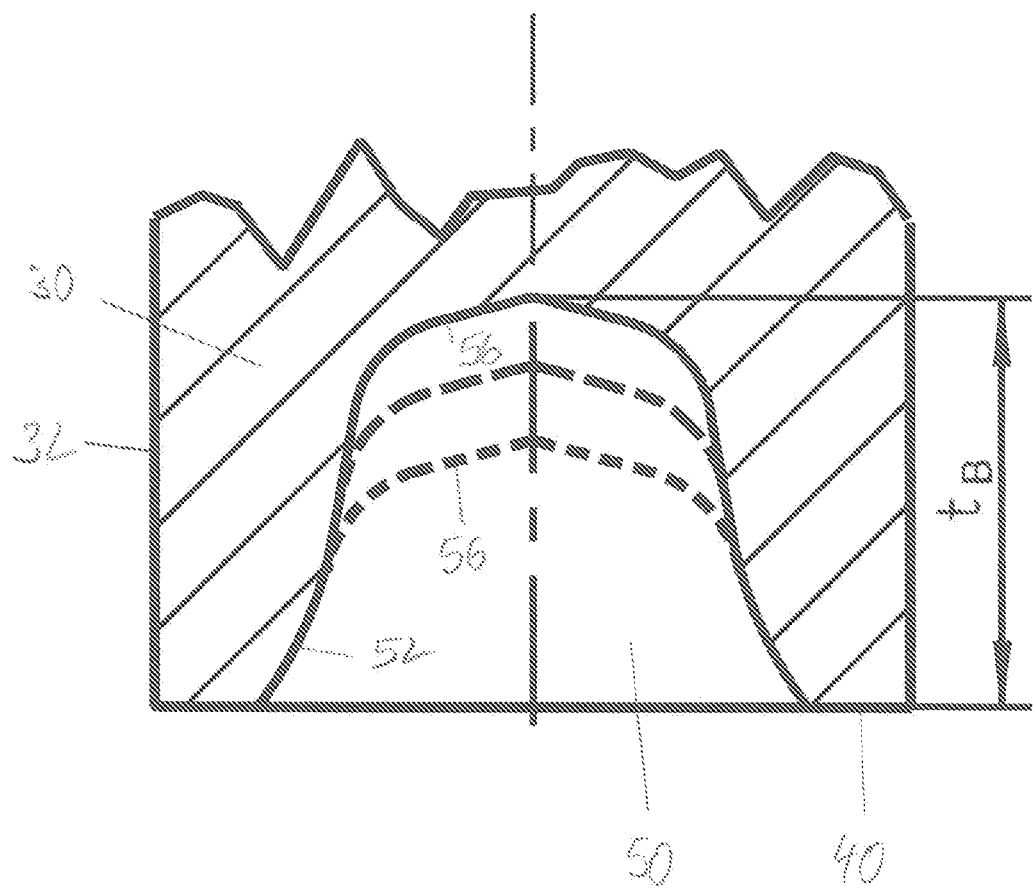

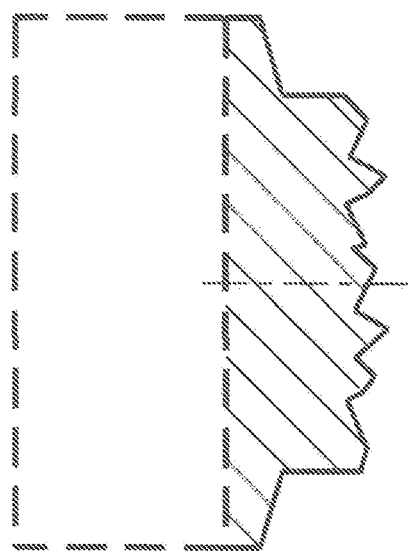
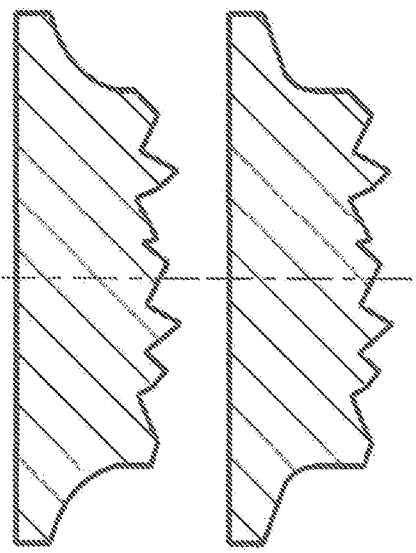
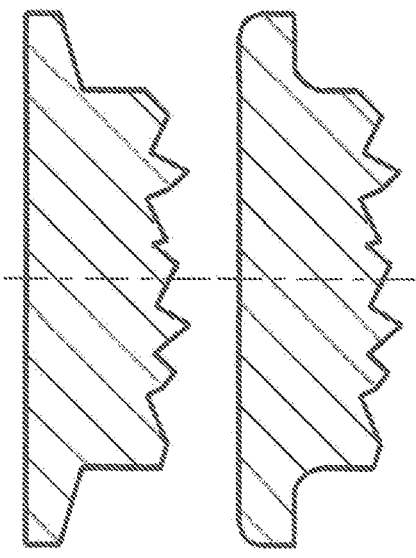
Fig. 6A  Fig. 6B  Fig. 6D
Fig. 6C

SEMI-HOLLOW PUNCH RIVET, A PUNCH RIVET JOINT OF AT LEAST TWO COMPONENTS BY MEANS OF A SEMI-HOLLOW PUNCH RIVET AS WELL AS A METHOD FOR CONNECTING THE COMPONENTS WITH THE SEMI-HOLLOW PUNCH RIVET

CROSS REFERENCE TO RELATED APPLICATIONS

This application claims the priority of German patent application No. 102019102383.1, filed on Jan. 30, 2019. The entire content of this priority application is incorporated herein by reference in its entirety.

TECHNICAL FIELD

The present disclosure is related to a semi-hollow punch rivet by means of which a connection or joint between at least two components is establishable which are arranged pile-shaped above each other. Further, the present disclosure relates to a punch rivet joint of at least two components which are arranged pile-shaped above each other as well as a method for connecting or joining the at least two components by means of the semi-hollow punch rivet.

BACKGROUND

For reducing the carbon dioxide emissions, the manufacturers of cars focus on the development of new vehicle bodies by means of which weight reductions can be achieved. For this reason, the share of highest-strength materials, as for example 22MnB5 (Usibor), increases in safety relevant sections of motor vehicles. Further, the lightweight design is increasingly used for constructing vehicles.

A semi-hollow punch rivet for the above application area is described for example in DE 10 2009 050 342 B4. This punch rivet has a greater shaft wall thickness as well as a larger shaft diameter compared to punch rivet geometries commonly up to now. With this semi-hollow punch rivet, Usibor-layers up to a sheet thickness with a maximum of 1.7 millimeters can be joined. Due to the increased shaft diameter, the punch force or setting force required for introducing the semi-hollow punch rivet into the pile of components is, however, increased. Further, default joining systems are not suitable for processing such punch rivets as they are designed for separating and transmitting punch rivet elements with about 5.5 millimeter shaft diameter. Thus, it is looked for alternative joining elements as the above-described semi-hollow punch rivet is a special solution.

Similarly resistant solutions as the above-described punch rivet geometry are disclosed in DE 10 2013 020 504 A1 as well as EP 2 024 651 B2.

EP 0 833 063 B1 describes a semi-hollow punch rivet of light metal as for example aluminum or an aluminum alloy. This semi-hollow punch rivet is used for joining light metal sheets or the like. As it does not consist of steel, a weight optimized connecting or joining element is used besides the usage of light metal sheets. Problematic is, however, the usage of the semi-hollow punch rivet of light metal for steel joints or higher-strength steels. Due to the high joining forces required in this context, the semi-hollow punch rivet does not have the appropriate stability.

The semi-hollow punch rivet of the above mentioned European patent comprises a conically formed shaft cavity at the shaft end facing away from the head. The shaft cavity is arranged rotationally symmetrical around the longitudinal axis of the rivet shaft. While the blunt rivet foot realizes the separation of the punch slug from the component to be pierced, the conical shape of the shaft cavity leads to a canting of the punch slug to be received. This is due to the acute intake of the shaft cavity, which is not completely usable due to a limited flowing of the slug material. This disadvantage is greater when connecting steel components, as it is for example described in EP 1 229 254 B1.

Another configuration possibility of a semi-hollow punch rivet with a blunt rivet foot is described in DE 10 2005 020 416 B4. When viewed in the longitudinal cross-section of the rivet shaft, the described semi-hollow punch rivet comprises a shaft cavity having a bell-like design. Starting at the radial inner side of the rivet foot, a convex shaped arc extends almost up to the bottom of the shaft cavity. At the bottom of the shaft cavity, the laterally arranged convex arcs are connected to each other via a combination of two further arcs. Contrary to the above-described configuration of a cone-shaped shaft cavity, the usage of convex shaped arcs leads to an even more increased tapering of the shaft cavity in the direction of the shaft bottom. Consequently, the slug gets stuck earlier in the shaft cavity after sufficient separation from the first component compared to the conically formed shaft cavity and hinders the forming of a connection or joint. Further, the usage of the arc-shaped convex wall design of the semi-hollow punch rivet results in the shaft having in the foot portion also a reduced stability due to the smaller wall thickness. Thus, the risk is present that the punch forces transmitted from the rivet head in axial direction cannot be transmitted effectively to the blunt rivet foot and the rivet shaft fails.

In view of the prior art it is thus the object of the present disclosure to provide an improved geometry for a semi-hollow punch rivet which ensures also a better receiving of the punch slug besides a reliable transmission of high punch forces.

SUMMARY

The present disclosure includes a semi-hollow punch rivet by means of which a connection or joint between at least two components is establishable which are arranged pile-like above each other. The semi-hollow punch rivet comprises the following features: a rivet head having a rivet shaft extending therefrom, which comprises a cylindrical lateral surface, a blunt rivet foot having a rivet foot front surface is provided at an end of the rivet shaft facing away from the rivet head, wherein the rivet foot front surface is arranged perpendicular to a longitudinal axis of the rivet shaft, and a shaft cavity which is shaped bell-like in the axial cross-section of the rivet shaft extends into the rivet shaft beginning at the end of the rivet shaft facing away from the head, wherein the bell-like shaped shaft cavity is formed by a convex inlet portion beginning at a radial inner side of the rivet foot front surface and extending circular arc-shaped with an inlet radius $R_S$ in the direction of the rivet head, a linearly extending continuation portion into which the inlet portion transitions tangentially and which is arranged in an acute angle with respect to the cylindrical lateral surface, and a final dome portion.

The construction of the semi-hollow punch rivet realizes an improved transmission of the punch force applied via the rivet head on the joining location. At this, the punch rivet geometry may ensure that the loss to deformation energy within the semi-hollow punch rivet before and/or during the entering of the semi-hollow punch rivet into at least the first component of a punch rivet joint by a deforming of the punch rivet is reduced or completely avoided. Thus, the mechanical energy supplied via the rivet head may be completely available for the introducing or penetrating of the rivet shaft into the at least two components which are arranged pile-shaped above each other and the punching out of a punch slug associated thereto.

While the geometry of the rivet shaft ensures on the one hand a more effective transmission of the punch energy to the joining location, the shaft cavity arranged rotationally symmetrically to the longitudinal axis of the rivet shaft ensures an improved receiving of the punch slug. This may be realized by the combination of the arc-shaped convex formed inlet portion with an additionally linearly extending continuation portion in the direction of the rivet head in the shaft cavity. While on the one hand the arc-shaped formed inlet portion may reduce the occurrence of mechanical tension peaks at the creation of the punch slug, the linear continuation portion may provide a reduced tapering of the shaft cavity in the direction of its depth. Thus, a volume in the shaft cavity provided for the receiving of the punch slug may be used such that it provides a large receiving volume for the punch slug without a loss of stability of the rivet shaft.

The final dome portion provided at the bottom of the shaft cavity may be closed or alternatively also formed open in the direction of the rivet head by a through opening. The opening in the dome portion may provide a further receiving volume for material of the punch slug by a through opening to the rivet head or a blind hole.

According to a further embodiment, the shaft diameter $D_A$ of the semi-hollow punch rivet has a size of $D_a \leq 5.6$ mm, or $D_a = 5.5$ mm.

The semi-hollow punch rivet may be realized with the above-described shaft diameter. This shaft diameter may be adapted to usual supply systems as well as punch rivet systems and can be combined with them without extensive constructive redesigns of the system technology.

It may also be preferred to use another shaft diameter as the above defined. This is because the above summarized geometry of the semi-hollow punch rivet can be realized independent from the above defined shaft diameter equally with larger as well as with smaller shaft diameters.

According to a further embodiment of the geometry of the semi-hollow punch rivet, the rivet foot front surface thereof has a radially extending foot width $B_S$ in the range of $\frac{1}{30} D_a \leq B_S \leq \frac{1}{3} D$, or $\frac{1}{15} D_a \leq B_S \leq \frac{1}{6} D_a$.

The semi-hollow punch rivet may comprise a blunt foot geometry. This means that the rivet foot front surface extends perpendicular with respect to the longitudinal axis of the rivet shaft. It may also be preferred that the rivet foot front surface comprises the above given radial width to be able to transmit the punch force applied via the rivet head optimally to the first component at the joining location. The size of the rivet foot front surface may be in this context especially advantageous for the transmission of high rivet forces at the joining of high-strength or higher-strength steels.

It may be further preferred to use the semi-hollow punch rivet with the rivet foot geometry for producing a joining connection in a pile of at least three components arranged above each other and made of the same and/or different materials. Such a joining connection must first of all ensure that the stability of the semi-hollow punch rivet ensures the introduction of a sufficiently high mechanical energy into the joining location. This may be realized by the foot geometry of the semi-hollow punch rivet in combination with the shaft geometry. This may be due to the shaping of the shaft cavity which also may ensure a sufficient wall thickness of the rivet shaft in the portion of the shaft cavity, which is not overstressed by the punch force transmitted from the rivet head to the punch foot. In combination therewith the shaft cavity provides a sufficiently large receiving volume for the punch slug which may be composed at a connection of at least three components of the material of the first and second components viewed in joining direction.

The inlet radius $R_S$ comprises according to a further embodiment of the semi-hollow punch rivet with respect to the foot width $B_S$ the following size: $R_S \leq 20\ B_S$, or $0.3\ \text{mm} \leq R_S \leq 6\ \text{mm}$ or $1\ \text{mm} \leq R_S \leq 4\ \text{mm}$.

The close coordination between the foot width of the blunt rivet foot as well as the size of the inlet radius may be directed to an ideal functional orientation of the geometry of the semi-hollow punch rivet. For depending on the components to be connected to each other, the punch force to be applied requires a respective size of the foot width. While the inlet portion into the shaft cavity beginning at the radially inner edge of the foot width shall not weaken the rivet shaft of the semi-hollow punch rivet, it may be adjusted at the same time such that a sufficiently large receiving volume is provided in the shaft cavity for the punch slug. Thus, it may be preferred to choose the foot width of the punch foot in close coordination with the size of the inlet radius.

The continuation portion is arranged in an acute angle with respect to the cylindrical lateral surface of the rivet shaft according to a further embodiment of the geometry of the semi-hollow punch rivet. This acute angle $\alpha$ may be in the range of $5° \leq \alpha \leq 30°$, or $5° \leq \alpha \leq 20°$, with respect to the cylindrical lateral surface.

The inlet portion which is formed arc-shaped based on the inlet radius $R_S$ may transition directly tangentially into the linear continuation portion. The continuation portion in turn may be formed like the lateral surface of a truncated cone. Thus, this lateral surface or the surface of the continuation portion within the shaft cavity, respectively, has a defined angular orientation with respect to the cylindrical lateral surface of the rivet shaft. The range of the acute angle $\alpha$ in the range of $5° \leq \alpha \leq 20°$ may provide a compromise between a receiving volume of the shaft cavity which is as large as possible and an ideal link to the arc-shaped inlet portion.

According to a further embodiment of the semi-hollow punch rivet especially in combination with the above-described shaft diameter, a depth $t_B$ of the bell-like shaped shaft cavity with respect to the shaft diameter $D_a$ in the range of $\frac{1}{3} D_a \leq t_B \leq \frac{2}{3} D_a$ is provided.

For being able to adjust the receiving volume of the shaft cavity to the punch slug to be received and thus to the planned joining connection, the depth of the bell-like shaped shaft cavity is adjustable. It may be adjusted depending on the chosen shaft diameter. Further, it was recognized in some embodiments of the semi-hollow punch rivet that despite the above chosen depth range of the shaft cavity depending on the shaft diameter a sufficient stability of the semi-hollow punch rivet is ensured at the producing of the joining connections or joints.

According to a further embodiment of the semi-hollow punch rivet, the bell-like shaped shaft cavity comprises a central through opening to the rivet head extending in the longitudinal direction of the rivet shaft or a blind hole to form a hollow rivet. By means of these constructive measures, an enlargement of the receiving volume of the shaft cavity is realizable as it has been described above already.

The present disclosure comprises further a punch rivet joint of at least two components arranged pile-shaped above each other, which are connected to each other by means of the above-described semi-hollow punch rivet. Due to the variability in the geometry of the semi-hollow punch rivet it may be possible to process different component materials within one joining connection or joint. Accordingly, the semi-hollow punch rivet may be used for the joining of high-strength and higher-strength steels of different components. In the same way it may be preferred to use the above-described semi-hollow punch rivet for joining components of light metals or for joining components of light metals and steels.

The present disclosure in this context also includes a method for connecting or joining at least two components by means of the above-described semi-hollow punch rivet. This connecting method comprises the following steps: arranging the at least two components above each other in a pile-shaped arrangement on a die or an anvil and setting a semi-hollow punch rivet according to one of the above described embodiments into the at least two components.

BRIEF DESCRIPTION OF THE DRAWINGS

The embodiments of the present disclosure will be described in detail based on the accompanying drawings. Showing.

DETAILED DESCRIPTION

Figure 1:
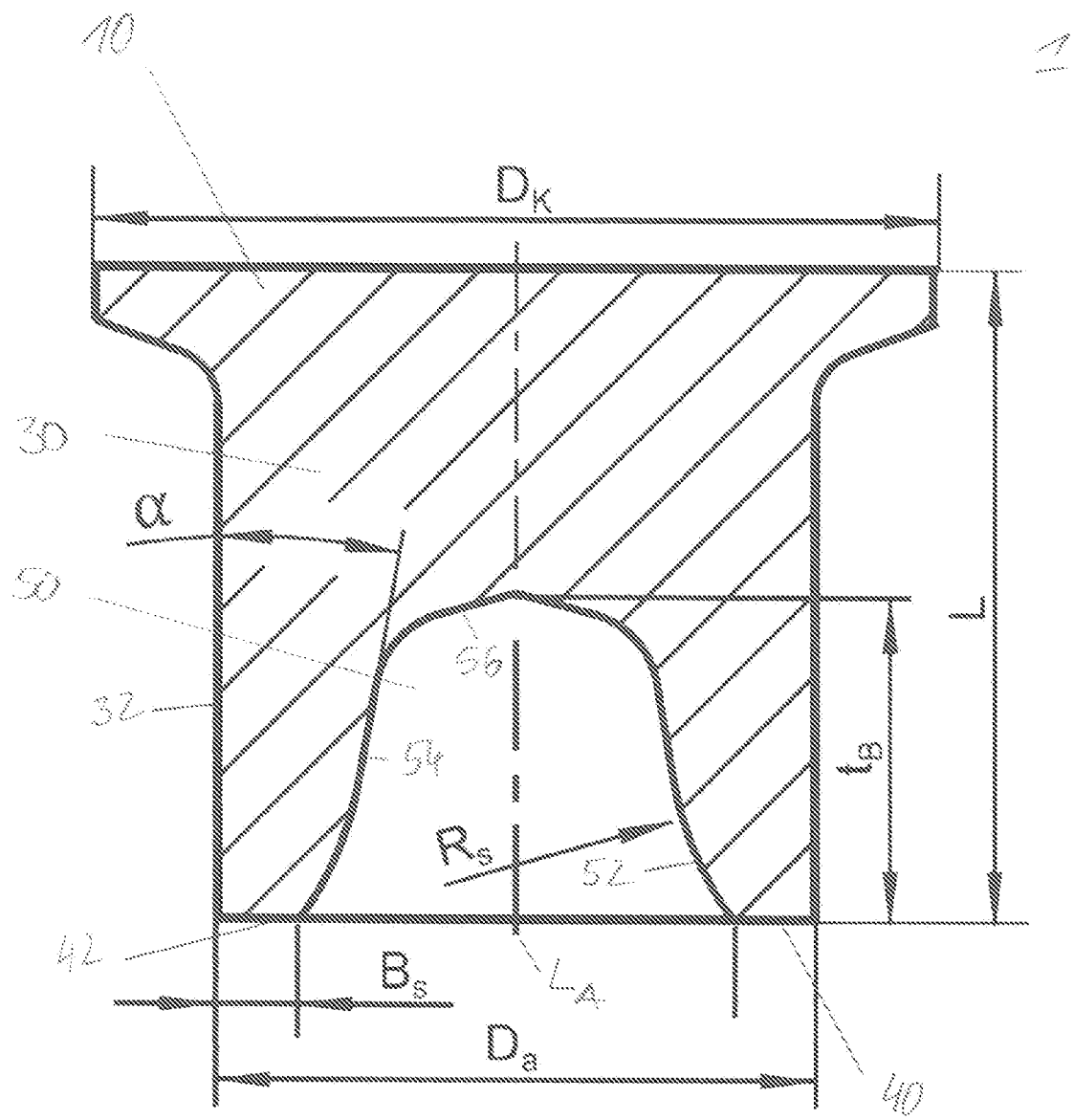
FIG. 1 a schematic cross-sectional view of an embodiment of the semi-hollow punch rivet with characteristic dimensions for defining the geometry of the semi-hollow punch rivet, FIG. 2 an enlargement of a section of FIG. 1 in which the consequences of a variation of the size of the inlet radius with respect to the convex inlet portion and thus the variation of the shape of the shaft cavity is shown, FIG. 3 an enlargement of a section of FIG. 1 in which the shaft cavity and its changed shape due to the variation of the acute angle of the linearly extending continuation portion with respect to the shaping of the shaft cavity and its volume is shown, FIG. 4 an enlargement of a section of FIG. 1 illustrating a variation of the foot width of the blunt rivet foot of the semi-hollow punch rivet, FIG. 5 an enlargement of a section of FIG. 1 in which a changed depth of the shaft cavity and the consequences with respect to the volume of the shaft cavity is illustrated, FIGS. 6a, 6b, 6c and 6d illustrations of designs of the rivet head of the semi-hollow punch rivet, FIG. 7 a schematic cross-sectional view of the semi-hollow punch rivet with through opening from the shaft cavity to the rivet head for forming a hollow rivet and FIG. 8 a schematic cross-sectional view of a punch rivet joint with two components, FIG. 9 a schematic cross-sectional view of a punch rivet joint with three components, and FIG. 10 a flowchart of an embodiment of the connecting method with the aid of the semi-hollow punch rivet.

An embodiment of the semi-hollow punch rivet 1 is shown in FIG. 1. FIG. 1 is a schematical cross-sectional view transverse to the longitudinal axis $L_A$ of the semi-hollow punch rivet 1.

The semi-hollow punch rivet 1 comprises a rivet head 10 with a rivet shaft 30 extending therefrom. The rivet head 10 has depending on the case of application a head shape as they are exemplarily shown in FIG. 6. Accordingly, the rivet shaft 30 may be combined with a countersunk head (FIG. 6A), a countersunk head with arc-shaped transition to the rivet shaft 30 (FIG. 6B) or a flat-round head (FIG. 6C). It may also be preferred to combine the rivet head 10 with a functional element 12 as for example a threaded bolt or a nut (FIG. 6D).

The rivet shaft 30 comprises opposite to the rivet head 10 a blunt rivet foot 40. The rivet foot 40 comprises the rivet foot front surface 42. The rivet foot front surface 42 may be arranged perpendicular to a cylindrical lateral surface 32 of the rivet shaft 30. In the same manner, the rivet foot front surface 42 extends perpendicular to the longitudinal axis $L_A$ of the semi-hollow punch rivet 1.

Starting at the rivet foot 40 a shaft cavity 50 extends in the direction of the rivet head 10 in the interior of the rivet shaft 30. The shaft cavity 50 is arranged rotationally symmetrically around the longitudinal axis $L_A$ of the semi-hollow punch rivet 1.

As can be seen based on the cross-sectional illustration along the longitudinal axis $L_A$ in FIG. 1, the shaft cavity 50 has a bell-like design with an opening adjacent to the rivet foot 40.

The shaft cavity 50 in the rivet shaft 30 may be formed such that besides a sufficient stability of the rivet foot 40 at high punch forces also a sufficiently large receiving volume for the punch slug in the shaft cavity 50 results. In this context, the rivet shaft 30 may be formed as solid element beginning at the rivet head 10.

The rivet shaft 30 provided as solid element extends according to one embodiment at least up to the middle of the semi-hollow punch rivet 1 with an overall length L. In this way, an extensive distribution of the joining force or the punch force in the head near portion of the semi hollow punch rivet 1 may be ensured. This punch force is first of all transmitted over the complete cross-sectional face of the rivet shaft 30 in the direction of the rivet foot 40. The share of the solid element at the rivet shaft 30 is defined by the depth of the shaft cavity 50 as it is explained below.

Due to the shaft cavity 50, the rivet shaft 30 is formed hollow in the foot portion. The shaft cavity 50 extends in a central symmetrical arrangement around the longitudinal axis $L_A$ in the direction of the rivet head 10. A depth $t_B$ of the shaft cavity 50 is chosen such that the semi-hollow punch rivet 1 is deformed during the setting process only in the lower half of the rivet shaft 30, thus in the half of the rivet shaft 30 adjacent to the rivet foot 40. Thus, the geometry of the shaft cavity 50 explained in detail below ensures also a sufficient spreading of the hollow shaft section for forming an undercut in the produced punch rivet joint. This is exemplarily shown in the schematic illustrations of the punch rivet joints of FIGS. 8 and 9.

In a further embodiment of the semi-hollow punch rivet 1, it has a shaft diameter $D_a$ of $D_a \leq 5.6$ mm. The shaft diameter $D_a$ may be equal to 5.5 mm so that the semi hollow punch rivet 1 is processable with common punch rivet systems and supply systems.

In this context, the rivet head 10 may be manufactured with a head diameter $D_k$ equal to 7.75 mm. This default size ensures the usage of known joining systems and rivet supply systems.

According to a further embodiment it may also be preferred to combine the above described geometry of the semi-hollow punch rivet 1 with other shaft diameters $D_a$ and/or head diameters $D_k$.

Further the rivet length L of the semi-hollow punch rivet 1 may be in the range of 4 mm≤L≤9 mm. Depending on the case of application, the rivet length L is adapted to the joining connection or joint to be produced or the pile thickness of the components to be connected to each other.

For being able to realize different joining tasks, the semi-hollow punch rivet 1 may be manufacturable from different materials. The rivet materials may be steel, aluminum or copper. Here, also further materials may be preferred to realize respective joining tasks.

As can be seen based on the illustration of the shaft cavity 50 in FIG. 1, a convex inlet portion 52 begins at the radial inner edge of the rivet foot 40. The convex inlet portion 52 extends arc-shaped in the direction of the rivet head 10.

The arc-shaped inlet portion 52 has according to an embodiment a radius $R_S$ which is defined depending on the foot width $B_S$ of the rivet foot 40. The radially extending foot width $B_S$ of the rivet foot front surface 42 may be in the range of $1/30\ D_a \leq B_S \leq 1/3\ D_a$, wherein $D_a$ describes the above discussed shaft diameter. The foot width $B_S$ may be in the range of $1/15\ D_a \leq B_S \leq 1/6\ D_a$.

Figure 4:
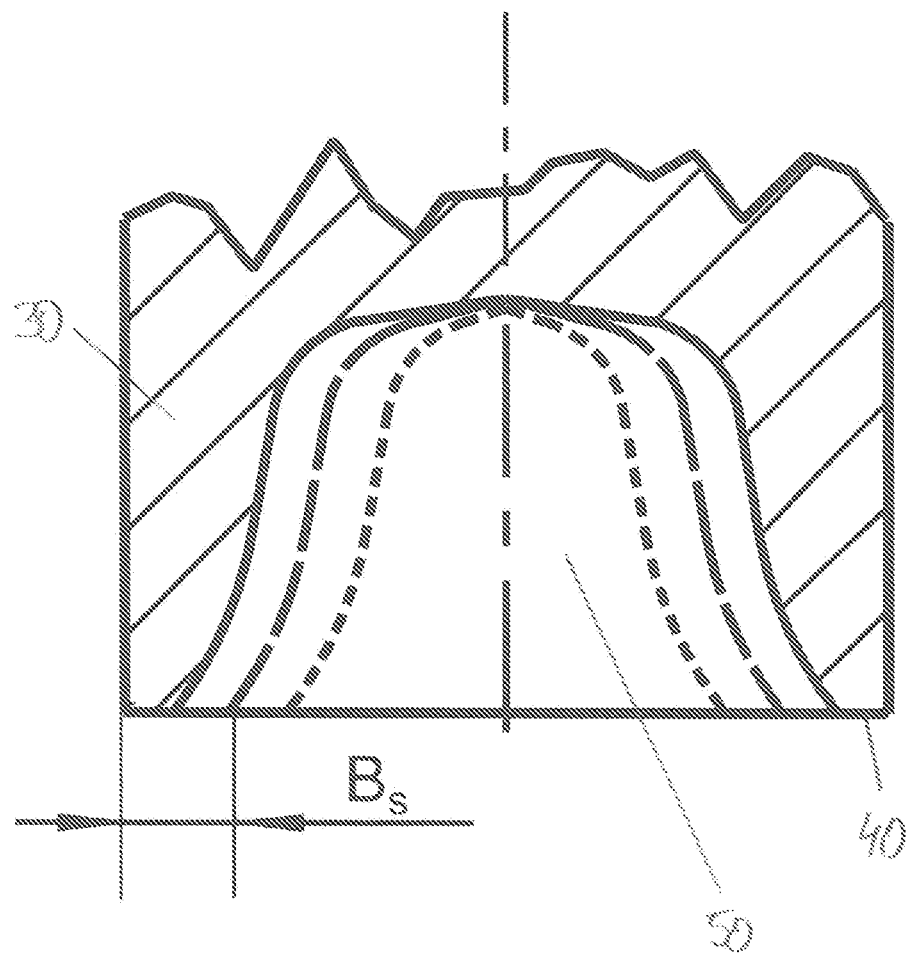

A schematic illustration of the variation of the foot width $B_S$ is shown in FIG. 4. It is made clear how the increasing foot width $B_S$ has as a consequence a strengthening of the rivet foot 40. It may also be made clear that an increasing of the foot width $B_S$ leads to a decreasing of the receiving volume of the shaft cavity 50.

The lower limit of the given greater range for the rivet foot width $B_S$ ensures that the rivet foot 40 spreads only after penetrating the cover layer or of a first component in a pile of components. Due to this, a larger undercut formation in the punch rivet joint is ensured which supports the connection of the components.

The stiffness of the rivet foot 40 increases with increasing foot width $B_S$. Accordingly, with increasing foot width $B_S$ the deformation of the rivet foot 40 or the spreading of the rivet foot 40 is restricted or made difficult. In this context, it has been recognized as advantageous not to extend the foot width $B_S$ beyond the above given upper limit to provide a still sufficient foot deformation and a sufficient large receiving volume for the punch slug in the shaft cavity 50.

Figure 2:
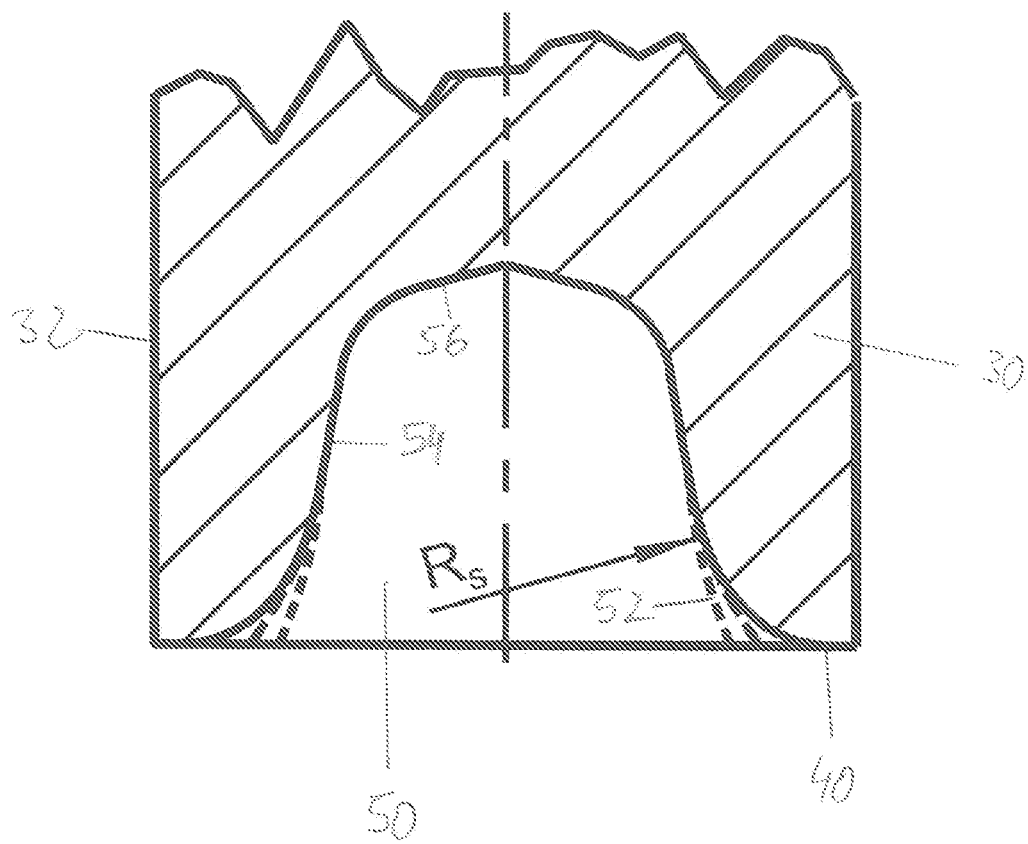

Based thereon, the inlet radius $R_S$ may be defined as a multiple of the foot width $B_S$, especially according to $R_S \leq 20\ B_S$. Further the inlet radius $R_S$ may have a size of 0.3 mm $\leq R_S \leq 6$ mm or 1 mm $\leq R_S \leq 4$ mm. A variation of the inlet radius $R_S$ is schematically shown in FIG. 2.

The convex inlet portion 52 in the radii range makes a flowing widening of the rivet foot 40 during a joining process possible. The flowing widening of the rivet foot 40 may be also connected to a flowing rising of a punch slug into the shaft cavity 50. This is especially advantageous in case ductile material, for example aluminum, as cover layer is combined with a press-hard steel as second layer or as middle layer in a pile of components and in a punch rivet joint provided therein (see FIGS. 8 and 9).

When exceeding the upper limit of the given range of the inlet radius $R_S$, the inlet portion 52 may comprise a curvature which is too small. Accordingly, the inlet portion 52 has an almost linear course so that the effect of the flowing widening gets lost.

If the inlet radius $R_S$ according to the lower limit with less than 0.3 mm is chosen to small, a sharp-edged inlet portion prevents a flowing widening and entering (see above). Accordingly, it may further be preferred to provide the inlet radius $R_S$ in the range of 1 mm $\leq R_S \leq 4$ mm.

The convex inlet portion 52 transitions tangentially into the linearly extending continuation portion 54. The continuation portion 54 is formed similar to a lateral surface of a truncated cone which may follow directly behind the inlet portion 52.

The linearly extending continuation portion 54 may be arranged in an acute angle α (see FIG. 1) with respect to the cylindrical lateral surface 32 of the rivet shaft 30. According to different embodiments, the continuation portion 54 may be arranged in an angle α in the range of $5° \leq \alpha \leq 30°$, or $5° \leq \alpha \leq 20°$.

The acute angle α of the continuation portion 54 has influence on the rigidity of the rivet foot 40 and the formation of an undercut associated therewith in a joining connection. In this regard, an angle $\alpha > 30°$ prevents a sufficient spreading of the rivet foot 40. Further, due to this large angle, the shaft cavity 50 would be reduced too much for a punch slug receiving.

Figure 3:
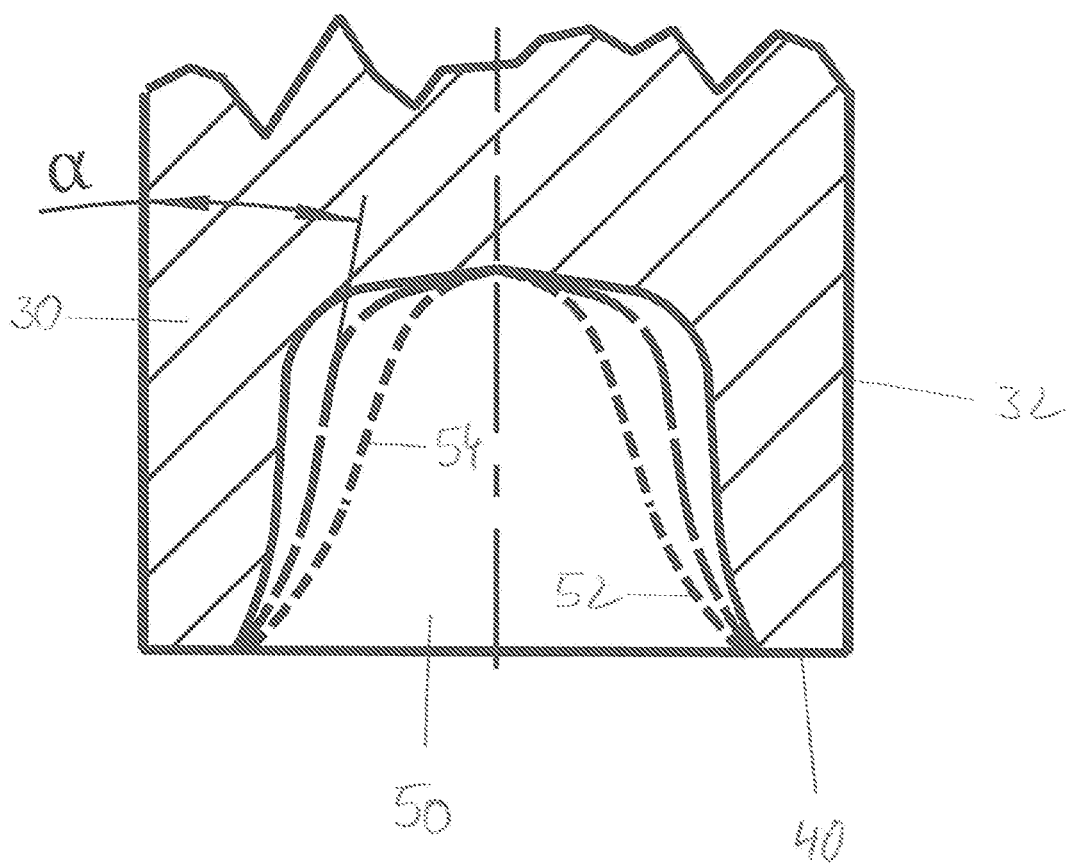

The influence of a change of the angle α is schematically shown in FIG. 3.

According to a further embodiment, the shaft cavity 50 has a depth $t_B$. The depth $t_B$ is defined as the distance between the rivet foot front surface 42 and a point of a dome section 56 which is nearest to the rivet head 10.

The depth $t_B$ may be in the range of $1/3\ D_a \leq t_B \leq 2/3\ D_a$. The depth $t_B$ defines the size of the receiving volume for a punch slug in the shaft cavity 50. Thus, according to a further embodiment, the depth $t_B$ is chosen as large as possible. In this context it has to be noted that with increasing depth $t_B$ of the shaft cavity 50 also the rigidity of the semi-hollow punch rivet 1 is decreased in the foot portion 40.

The above given range is chosen such that at least sheet thicknesses of up to 1.2 mm can be received as punch slug in the shaft cavity 50.

Figure 7:
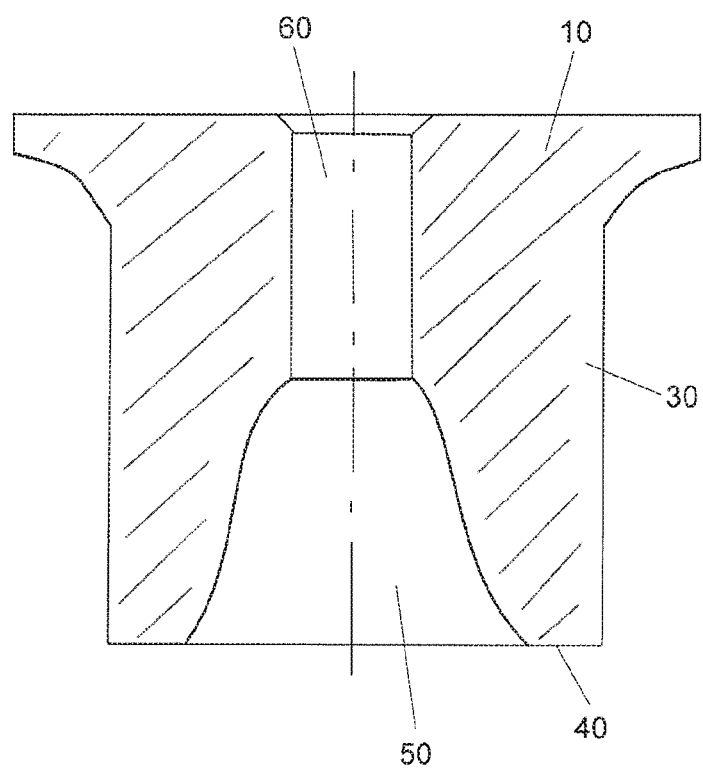

In FIG. 7, the embodiment of the semi-hollow punch rivet 1 with a through opening 60 is shown. The through opening 60 connects the shaft cavity 50 to the upper side of the rivet head 10. Thus, a hollow rivet may be provided in which the through opening 60 additionally makes the receiving and a rising of the material of a punch slug possible.

Figure 10:
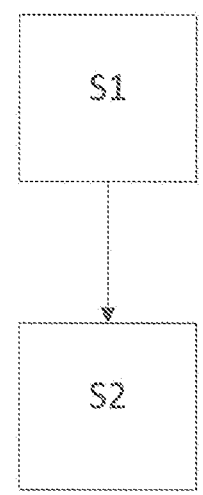

FIG. 10 shows a flowchart of a connection method of at least two components by means of the above described semi-hollow punch rivet 1. In a first step S1, the at least two components B1, B2 are arranged above each other in a pile-shaped arrangement on a die or an anvil. In a subsequent second step, a setting of the semi-hollow punch rivet 1 into the pile of components is performed to connect the components B1, B2 to each other.

Figure 8:
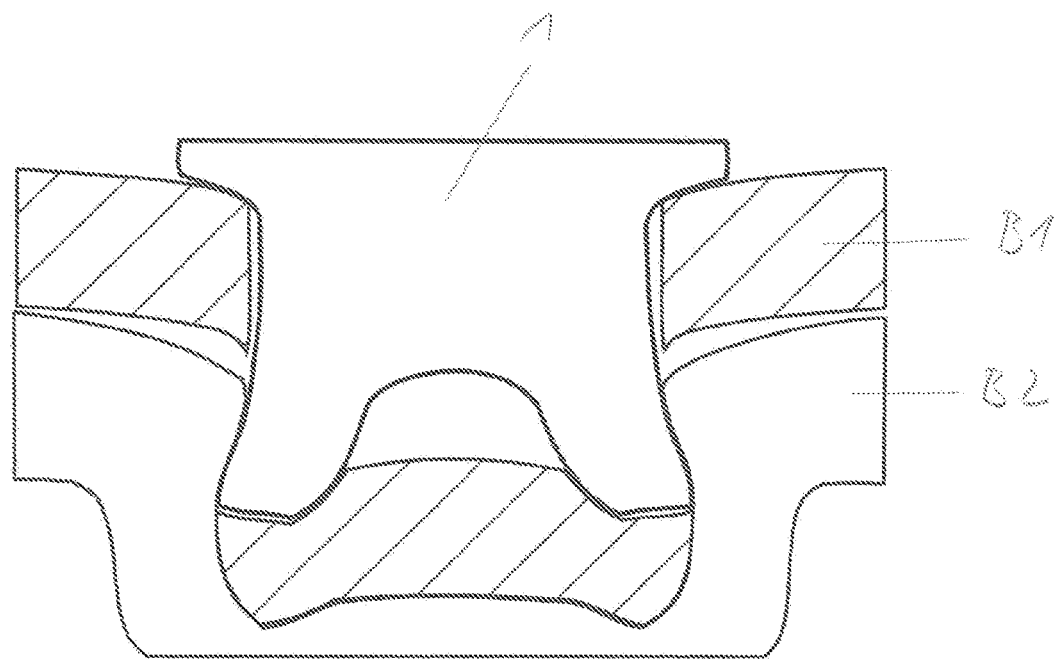
Figure 9:
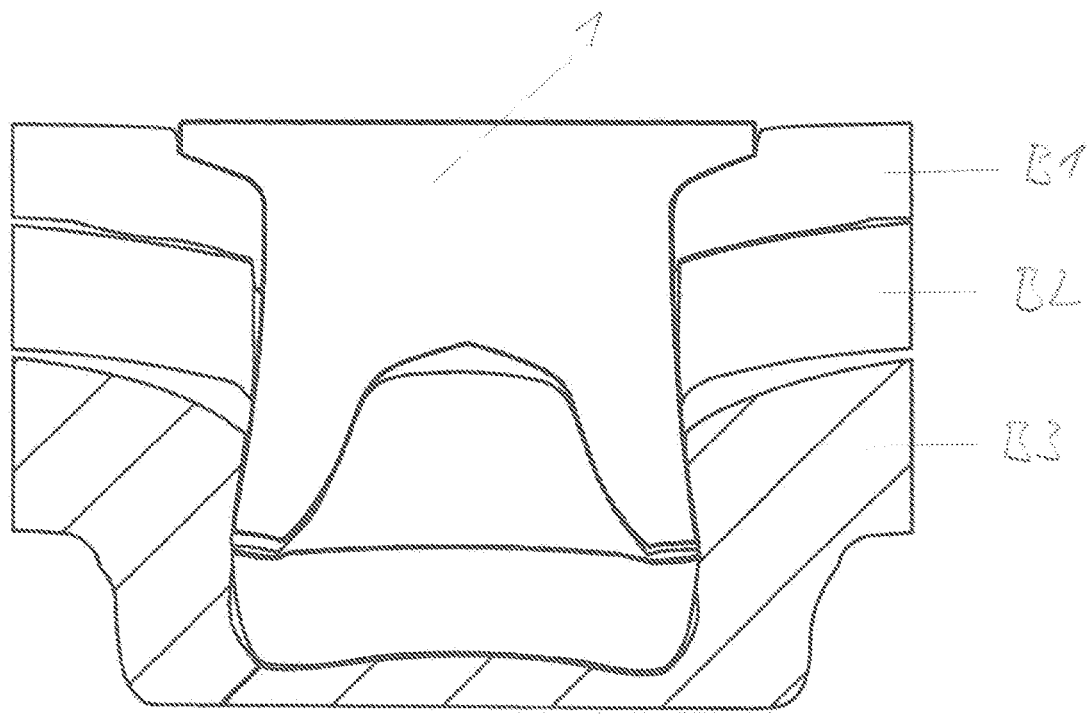

Correspondingly, a punch rivet joint of at least two components B1, B2, B3 is provided which are connected to each other in a pile-shaped arrangement by means of the above described semi-hollow punch rivet 1. An exemplary illustration of a produced punch rivet joint is shown in each of FIGS. 8 and 9. In FIG. 8, the semi-hollow punch rivet 1 connects the two components B1 and B2. In FIG. 9, three components B1, B2, B3 of a pile of components are connected to each other via the semi-hollow punch rivet 1. While in both punch rivet joints a part of the punched out material is at least partly received in the shaft cavity 50, a closing head may have been formed opposite to the rivet head 10.

The invention claimed is:

1. A semi-hollow punch rivet by which a joint between at least two components is establishable which are arranged in a pile above each other, which comprises the following features:
   a. a rivet head having a rivet shaft extending therefrom, which comprises a cylindrical lateral surface, b. a blunt rivet foot having a rivet foot front surface which is arranged perpendicular to a longitudinal axis $L_A$ of the rivet shaft, wherein said blunt rivet foot is provided at an end of the rivet shaft facing away from the rivet head, and c. a shaft cavity which is bell-shaped in an axial cross-section of the rivet shaft extends into the rivet shaft starting at the end facing away from the head, wherein the bell-shaped shaft cavity is formed by
   i. a convex inlet portion starting at a radial inner side of the rivet foot front surface and extending circular arc-shaped with an inlet radius $R_S$ in the direction of the rivet head,
   ii. a linearly extending continuation portion into which the inlet portion transitions tangentially and which is arranged in an acute angle $\alpha$ with respect to the cylindrical lateral surface, and
   iii. a final dome portion, wherein d. one of the following is used as rivet material: steel, or copper.

2. The semi-hollow punch rivet according to claim 1, having a shaft diameter $D_a$ of $D_a \leq 5.6$ mm.

3. The semi-hollow punch rivet according to claim 2, wherein the rivet foot front surface has a radially extending foot width $B_S$ in the range of $1/30\, D_a \leq B_S \leq 1/3\, D_a$.

4. The semi-hollow punch rivet according to claim 3, wherein the inlet radius $R_S$ comprises with respect to the foot width $B_S$ the following size: $R_S \leq 20\, B_S$.

5. The semi-hollow punch rivet according to claim 4, wherein the continuation portion is arranged in the acute angle $\alpha$ in the range of $5° \leq \alpha \leq 30°$ with respect to the cylindrical lateral surface.

6. The semi-hollow punch rivet according to claim 4, having a depth $t_B$ of the bell shaped shaft cavity with respect to the shaft diameter $D_a$ in the range of $1/3\, D_a \leq t_B \leq 2/3\, D_a$.

7. The semi-hollow punch rivet according to claim 4, wherein the bell shaped shaft cavity comprises a central through opening to the rivet head extending in the longitudinal direction of the rivet shaft or a blind hole to form a hollow rivet.

8. The semi-hollow punch rivet according to claim 3, wherein the continuation portion is arranged in the acute angle $\alpha$ in the range of $5° \leq \alpha \leq 30°$ with respect to the cylindrical lateral surface.

9. The semi-hollow punch rivet according to claim 3, having a depth $t_B$ of the bell shaped shaft cavity with respect to the shaft diameter $D_a$ in the range of $1/3\, D_a \leq t_B \leq 2/3\, D_a$.

10. The semi-hollow punch rivet according to claim 3, wherein the bell shaped shaft cavity comprises a central through opening to the rivet head extending in the longitudinal direction of the rivet shaft or a blind hole to form a hollow rivet.

11. The semi-hollow punch rivet according to claim 2, wherein the continuation portion is arranged in the acute angle $\alpha$ in the range of $5° \leq \alpha \leq 30°$ with respect to the cylindrical lateral surface.

12. The semi-hollow punch rivet according to claim 11, having a depth $t_B$ of the bell shaped shaft cavity with respect to the shaft diameter $D_a$ in the range of $1/3\, D_a \leq t_B \leq 2/3\, D_a$.

13. The semi-hollow punch rivet according to claim 11, wherein the bell shaped shaft cavity comprises a central through opening to the rivet head extending in the longitudinal direction of the rivet shaft or a blind hole to form a hollow rivet.

14. The semi-hollow punch rivet according to claim 2, having a depth $t_B$ of the bell shaped shaft cavity with respect to the shaft diameter $D_a$ in the range of $1/3\, D_a \leq t_B \leq 2/3\, D_a$.

15. The semi-hollow punch rivet according to claim 2, wherein the bell shaped shaft cavity comprises a central through opening to the rivet head extending in the longitudinal direction of the rivet shaft or a blind hole to form a hollow rivet.

16. The semi-hollow punch rivet according to claim 1, wherein the continuation portion is arranged in the acute angle $\alpha$ in the range of $5° \leq \alpha \leq 30°$ with respect to the cylindrical lateral surface.

17. The semi-hollow punch rivet according to claim 16, wherein the bell shaped shaft cavity comprises a central through opening to the rivet head extending in the longitudinal direction of the rivet shaft or a blind hole to form a hollow rivet.

18. The semi-hollow punch rivet according to claim 1, wherein the bell shaped shaft cavity comprises a central through opening to the rivet head extending in the longitudinal direction of the rivet shaft or a blind hole to form a hollow rivet.

19. A punch rivet joint of at least two components arranged pile-shaped above each other, which are connected to each other by the semi-hollow punch rivet according to claim 1.

20. A method for connecting at least two components by a semi-hollow punch rivet, comprising the following steps:
   I. providing a semi-hollow punch rivet by which a joint between the at least two components is establishable which are arranged in a pile above each other, which comprises the following features:
      a. a rivet head having a rivet shaft extending therefrom, which comprises a cylindrical lateral surface,
      b. a blunt rivet foot having a rivet foot front surface which is arranged perpendicular to a longitudinal axis $L_A$ of the rivet shaft, wherein said blunt rivet foot is provided at an end of the rivet shaft facing away from the rivet head, and
      c. a shaft cavity which is bell-shaped in an axial cross-section of the rivet shaft extends into the rivet shaft starting at the end facing away from the head, wherein the bell-shaped shaft cavity is formed by
         i. a convex inlet portion starting at a radial inner side of the rivet foot front surface and extending circular arc-shaped with an inlet radius in the direction of the rivet head,
         ii. a linearly extending continuation portion into which the inlet portion transitions tangentially and which is arranged in an acute angle a with respect to the cylindrical lateral surface, and
         iii. a final dome portion, wherein
      d. one of the following is used as rivet material: steel or copper.
   II. arranging the at least two components above each other in a pile-shaped arrangement on a die or an anvil and
   III. setting the semi-hollow punch rivet into the at least two components.

* * * * *